United States Patent
Kim

(10) Patent No.: US 10,812,692 B2
(45) Date of Patent: Oct. 20, 2020

(54) APERTURE MODULE AND CAMERA MODULE INCLUDING THE SAME

(71) Applicant: SAMSUNG ELECTRO-MECHANICS CO., LTD., Suwon-si (KR)

(72) Inventor: Jae Kyung Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 16/449,492

(22) Filed: Jun. 24, 2019

(65) Prior Publication Data

US 2020/0068100 A1    Feb. 27, 2020

(30) Foreign Application Priority Data

Aug. 22, 2018  (KR) .................. 10-2018-0098125
Oct. 31, 2018  (KR) .................. 10-2018-0131827

(51) Int. Cl.
*H04N 9/73*      (2006.01)
*H04N 5/225*     (2006.01)

(52) U.S. Cl.
CPC ................ *H04N 5/2254* (2013.01)

(58) Field of Classification Search
CPC ............................................. G03B 9/02
See application file for complete search history.

(56) References Cited

U.S. PATENT DOCUMENTS

| 2012/0170096 | A1  | 7/2012  | Kawamoto |
| 2017/0324892 | A1  | 11/2017 | Kim et al. |
| 2018/0039158 | A1  | 2/2018  | Shikama et al. |
| 2019/0377238 | A1* | 12/2019 | Kim ........................ G03B 9/06 |
| 2020/0077000 | A1* | 3/2020  | Lee ...................... H04N 5/2257 |

FOREIGN PATENT DOCUMENTS

| JP | 6188331 B2       | 8/2017  |
| JP | 2017-198935 A    | 11/2017 |
| JP | 2017-201382 A    | 11/2017 |
| KR | 10-2009-0105018 A | 10/2009 |
| KR | 10-1260625 B1    | 5/2013  |
| KR | 10-1477247 B1    | 12/2014 |
| KR | 10-2017-0123615 A | 11/2017 |

* cited by examiner

*Primary Examiner* — Gary C Vieaux
(74) *Attorney, Agent, or Firm* — NSIP Law

(57) ABSTRACT

A camera module includes an aperture module configured to be mounted on a lens module, the aperture module including a plurality of blades and being further configured to form various-sized aperture holes with the plurality of blades, and an aperture driving portion including a moving portion and a driving coil, the moving portion configured to be movable and including a driving magnet opposing the driving coil, the moving portion being directly or indirectly connected to the plurality of blades to enable the moving portion to move the plurality of blades. The moving portion is further configured to be movable in a fixed section in which the moving portion does not move the plurality of blades as the moving portion moves in the fixed section, and a driving section in which the moving portion moves the plurality of blades as the moving portion moves in the driving section.

24 Claims, 13 Drawing Sheets

APERTURE MODULE AND CAMERA MODULE INCLUDING THE SAME

CROSS-REFERENCE TO RELATED APPLICATION

This application claims the benefit under 35 USC 119(a) of Korean Patent Application Nos. 10-2018-0098125 filed on Aug. 22, 2018, and 10-2018-0131827 filed on Oct. 31, 2018, in the Korean Intellectual Property Office, the entire disclosures of which are incorporated herein by reference for all purposes.

BACKGROUND

1. Field

This application relates to an aperture module and a camera module including the same.

2. Description of Related Art

Camera modules have become a standard feature in portable electronic devices such as smartphones, tablet PCs, and laptop computers. A typical digital camera is provided with a mechanical aperture to adjust an amount of incident light passing through a lens according to a surrounding environment. However, it is difficult to provide a separate aperture module in a camera module used in small products such as portable electronic devices due to structural characteristics and spatial limitations.

For example, due to various components configured to drive such an aperture module, the weight of a camera module including the aperture module may be increased enough to deteriorate an autofocusing (AF) function or an optical image stabilization (OIS) function of the camera module. If the aperture module is provided with a power connection part configured to receive power to drive coils or other driving parts of the aperture module, the power connection part may interfere with vertical movement of a lens when the camera module performs autofocusing.

Additionally, the aperture module may consume an excessive amount of current may be unable to precisely adjust an aperture hole of an aperture module to various sizes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes an aperture module configured to be mounted on a lens module, the aperture module including a plurality of blades and being further configured to form various-sized aperture holes with the plurality of blades; and an aperture driving portion including a moving portion and a driving coil, the moving portion being configured to be movable and including a driving magnet opposing the driving coil, the moving portion being directly or indirectly connected to the plurality of blades to enable the moving portion to move the plurality of blades, wherein the moving portion is further configured to be movable in a fixed section in which the moving portion does not move the plurality of blades as the moving portion moves in the fixed section, and a driving section in which the moving portion moves the plurality of blades as the moving portion moves in the driving section, and the moving portion is further configured to move in response to power being supplied to the driving coil, and remain fixed at a position at which the moving portion is located at a time the power being supplied to the driving coil is cut off while the moving portion is located in the driving section.

The aperture module may be further configured to continuously change a size of the aperture hole.

The camera module may further include a yoke opposing the driving magnet, wherein an attractive force between the yoke and the driving magnet may hold the moving portion against the aperture module.

The yoke may have a shape that causes the attractive force between the yoke and the driving magnet to be greatest at one side of the fixed section, and the attractive force between the yoke and the driving magnet may be strong enough to pull the moving portion to the one side of the fixed section.

The attractive force between the yoke and the driving magnet may be strong enough to pull the moving portion to the one side of the fixed section at a time the power being supplied to the driving coil is cut off while the moving portion is located in the fixed section.

The moving portion may be further configured to be rectilinearly reciprocable.

Each of the plurality of blades may have a boomerang shape.

Each of the plurality of blades may have a V-shaped internal side portion forming a portion of the aperture hole.

Each of the plurality of blades may have a curved internal side portion forming a portion of the aperture hole.

The moving portion may be further configured to be movable in a linear motion, and the camera module may further include a rotation plate linked to the moving portion and the plurality of blades, and configured to rotate the plurality of blades in response to the moving portion moving in the linear motion.

The rotation plate may include a plurality of driving shafts configured to move the plurality of blades, each of the plurality of blades may include a driving shaft hole fitted onto a corresponding one of the driving shafts, and the driving shaft hole may include a first section substantially parallel to a rotation direction of the rotation plate, and a second section inclined to the rotation direction of the rotation plate.

The driving shafts move in the driving shaft holes as the rotation plate rotates, the driving shafts do not move the plurality of blades while the driving shaft shafts are moving in the first sections of the driving shaft holes, and the driving shafts move the plurality of blades while the driving shaft shafts are moving in the second section of the driving shaft holes.

In another general aspect, a camera module includes an aperture module configured to be mounted on a lens module, the aperture module including a plurality of blades and being further configured to form various-sized aperture holes with the plurality of blades; an aperture driving portion including a moving portion and a driving coil, the moving portion being configured to be movable and including a driving magnet opposing the driving coil, the moving portion being directly or indirectly connected to the plurality of blades to enable the moving portion to move the plurality of blades; and a yoke opposing the driving magnet, an attractive force between the yoke and the driving magnet holding the moving portion against the aperture module, wherein the attractive force between the yoke and the driving magnet is strong enough to pull the moving portion to one side of a moving section of the moving portion, and the moving section of the moving portion includes a section in which the attractive force between the yoke and the driving magnet is smaller than a minimum force required to move the moving portion in a stationary state.

The moving portion may move the plurality of blades while the moving portion moves in the section in which the attractive force between the yoke and the driving magnet is smaller than the minimum force required to move the moving portion in the stationary state.

The moving section of the moving portion may further include a fixed section in which the moving portion does not move the plurality of blades while the moving portion moves in the fixed section.

The moving portion may be further configured to move in response to power being supplied to the driving coil, and remain fixed at a position at which the moving portion is located at a time the power being supplied to the driving coil is cut off while the moving portion is located in the section in which the attractive force between the yoke and the driving magnet is smaller than the minimum force required to move the moving portion in the stationary state.

In another general aspect, an aperture module includes an aperture module including a plurality of blades configured to form an aperture hole; a driving coil; and a moving portion configured to be movable between a first position and a second position and including a driving magnet opposing the driving coil, the moving portion being linked to the plurality of blades to enable the moving portion to not move the plurality of blades as the moving portion moves from the first position to a third position between the first position and the second position, and move the plurality of blades to change a size of the aperture hole as the moving portion moves from the third position to the second position.

The plurality of blades may be further configured to form an aperture hole having a maximum size as the moving portion moves from the first position to the third position without moving the plurality of blades, and the moving portion may move the plurality of blades to change a size of the aperture hole from the maximum size to a minimum size as the moving portion moves from the third position to the second position.

The moving portion may be further configured to move in response to a current being supplied to the driving coil, return to the first position at a time the current supplied to the driving coil is cut off while the moving portion is moving between the first position and the third position, and remain at a position at which the moving portion is located at a time the current supplied to the driving coil is cut off while the moving portion is moving between the third position and the second position.

The aperture module may further include a rotation plate including a plurality of driving shafts and a guide hole, the plurality of blades may be further configured to rotate about respective axes to change a size of the aperture hole, each of the plurality of blades may include a driving shaft hole fitted onto a respective one of the driving shafts, the moving portion may further include a driving projection engaging the guide hole of rotation plate, and may be further configured to move in a linear motion between the first position and the second position, thereby moving the driving projection in a linear motion, and the rotation plate may be configured to rotate in response to the driving projection moving in the linear motion while engaging the guide hole of the rotation plate, thereby causing the driving shafts to move in the driving shaft holes and rotate the plurality of blades to change the size of the aperture hole.

In another general aspect, an aperture module includes an aperture module including a plurality of blades configured to form an aperture hole; a driving coil; a moving portion configured to be movable between a first position and a second position and including a driving magnet opposing the driving coil, the moving portion being linked to the plurality of blades to enable the moving portion to move the plurality of blades to change a size of the aperture hole as the moving portion moves; and a yoke opposing the driving magnet, wherein an attractive force between the yoke and the driving magnet holds the moving portion against the aperture module, and decreases from a maximum attractive force at the first position of the driving portion to a minimum attractive force at the second position of the driving force.

The yoke may include a main magnetic portion that is symmetrical with respect to a center point of a movement range of the moving portion; and an additional magnetic portion that is asymmetrical with respect to the center point of the movement range.

The attractive force between the yoke and the driving magnet may become less than a minimum force required to move the moving portion in a static state at a third position between the first position and the second position.

The moving portion may be further configured to move in response to a current being supplied to the driving coil, and the attractive force may be strong enough to pull the moving portion back to the first position at a time the current supplied to the driving coil is cut off while the moving portion is moving between the first position and a third position between the first position and the second position, but may not be strong enough to move the moving portion at a time the current supplied to the driving coil is cut off while the moving portion is moving between the third position and the second position.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
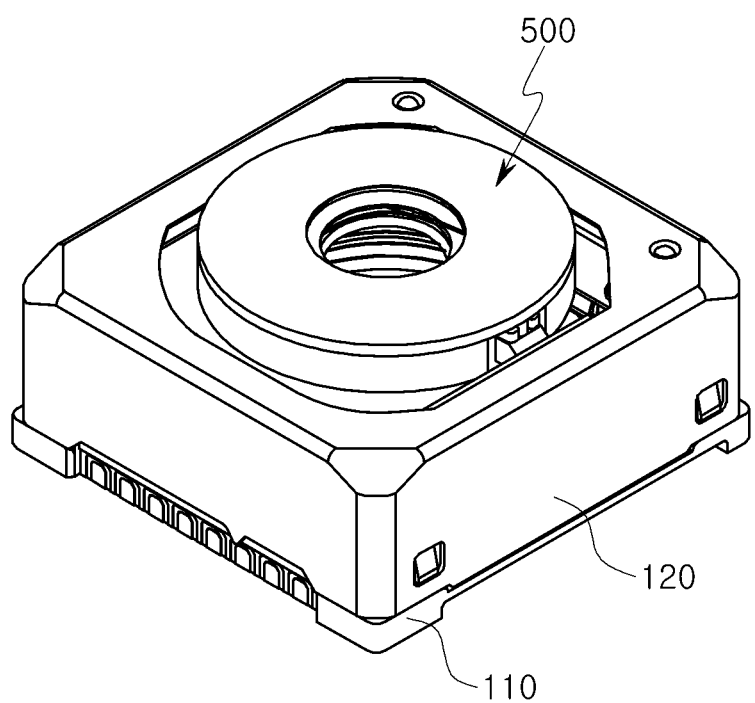
FIG. 1 is a perspective view of an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Examples of a camera module disclosed in this application may be mounted in a portable electronic device such as a mobile communications terminal, a smartphone, or a tablet personal computer (PC).

Figure 2:
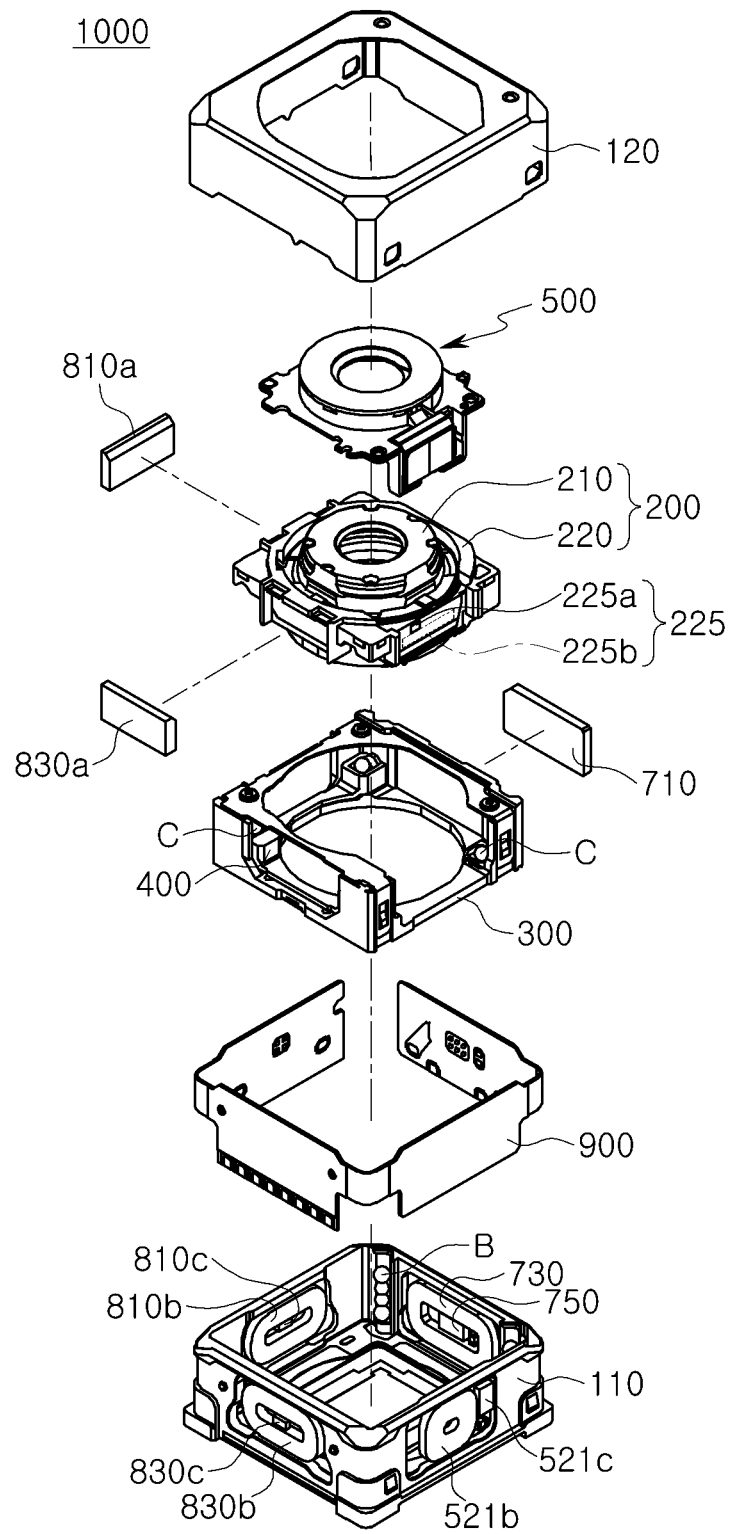
FIG. 2 is an exploded perspective view of the camera module of FIG. 1.
Figure 3A:
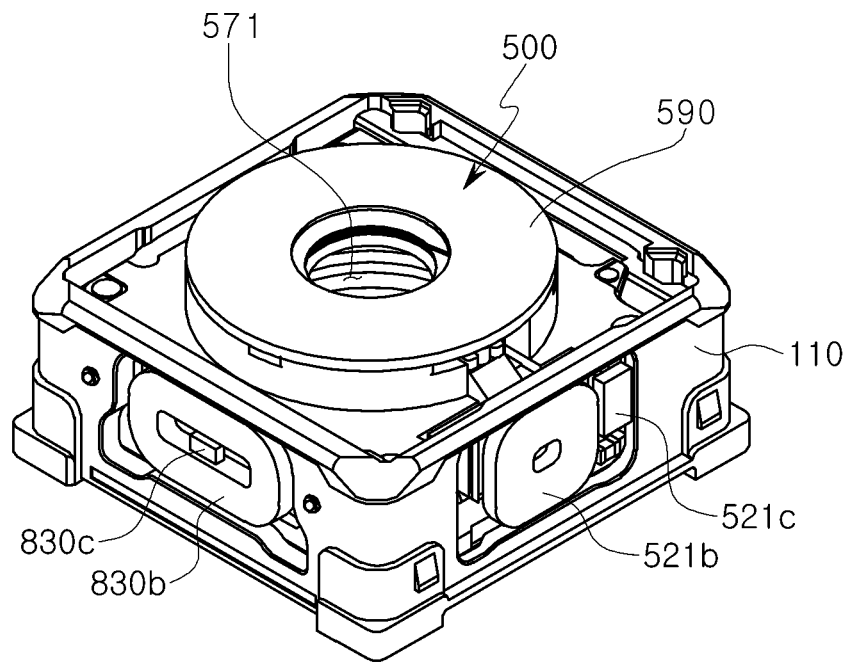
FIG. 3A is a perspective view of a portion of the camera module of FIG. 1.
Figure 3B:
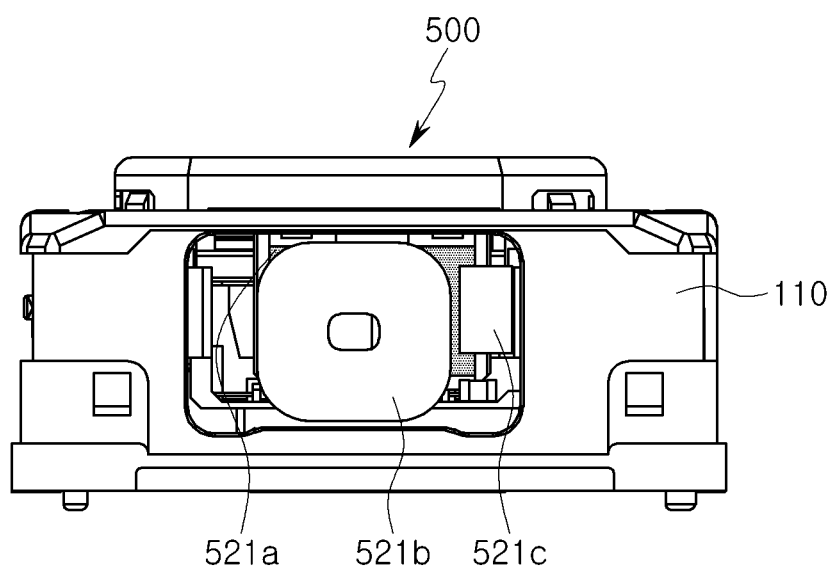
FIG. 3B is a side view of FIG. 3A.

FIG. 1 is a perspective view of an example of a camera module, FIG. 2 is an exploded perspective view of the camera module of FIG. 1, FIG. 3A is a perspective view of a portion of the camera module of FIG. 1. and FIG. 3B is a side view of FIG. 3A.

Referring to FIGS. 1 to 3B, a camera module 1000 includes a lens module 200, a carrier 300, a guide part 400, an aperture module 500, a housing 110, and a case 120.

The lens module 200 includes a lens barrel 210, which includes a plurality of lenses for capturing an image of a subject, and a holder 220 accommodating the lens barrel 210. The plurality of lenses are disposed in the lens barrel 210. The lens module 200 is accommodated in the carrier 300.

The lens module 200 is configured to be movable in an optical axis direction for focusing. As an example, the lens module 200 is configured to be movable in the optical axis direction together with the carrier 300 by a focusing portion of the camera module 1000.

The focusing portion includes a magnet 710 and a coil 730 generating a driving force in the optical axis direction. In addition, the camera module 1000 includes a position sensor 750, for example, a Hall sensor, to sense a position of the lens module 200 in the optical axis direction by sensing a position of the carrier 300 in which the lens module 200 is accommodated in the optical axis direction.

The magnet 710 is mounted on the carrier 300. As an example, the magnet 710 is mounted on one surface of the carrier 300.

The coil (AF driving coil) 730 and the position sensor 750 are mounted in the housing 110. As an example, the coil 730 and the position sensor 750 are fixed to the housing 110 to face the magnet 710. The coil 730 and the position sensor 750 are mounted on a substrate 900, and the substrate 900 is mounted in the housing 110.

The magnet 710 is a movable member mounted on the carrier 300 to move in the optical axis direction together with the carrier 300, and the coil 730 and the position sensor 750 are fixed members fixed to the housing 110.

When power is applied to the coil 730, the carrier 300 is moved in the optical axis direction by an electromagnetic interaction between the magnet 710 and the coil 730. In addition, the position sensor 750 senses a position of the carrier 300 in the optical axis direction.

Since the lens module 200 is accommodated in the carrier 300, the lens module 200 is also moved in the optical axis direction together with the carrier 300 by the movement of the carrier 300.

The aperture module 500 is mounted on the lens module 200, and thus is also moved in the optical axis direction together with the lens module 200.

Rolling members B are disposed between the carrier 300 and the housing 110 to reduce friction between the carrier 300 and the housing 110 when the carrier 300 is moved. The rolling members B may have a ball shape.

The rolling members B are disposed on both sides of the magnet 710 (or the coil 730).

A yoke (not illustrated in FIGS. 1 to 3B) is mounted on the substrate 900. As an example, the yoke and the magnet 710 are disposed to face each other with the coil 730 interposed therebetween.

An attractive force acts between the yoke and the magnet 710 in a direction perpendicular to the optical axis direction.

Accordingly, the rolling members B are maintained in a state of contact with the carrier 300 and the housing 110 by the attractive force between the yoke and the magnet 710.

In addition, the yoke serves to focus a magnetic force of the magnet 710. Accordingly, generation of a leakage flux from the magnet 710 is prevented.

As an example, the yoke and the magnet 710 form a magnetic circuit.

To correct image shaking caused by a user's hand shaking or other motions of the camera module 1000, the lens module 200 is moved in a first direction perpendicular to the optical axis direction, and a second direction perpendicular to the optical axis direction and the first direction.

For example, a shaking correction portion of the camera module 1000 provides a relative displacement corresponding to the image shaking to the lens module 200 to compensate for the image shaking when the image shaking occurs due to the user's hand shaking or other motions of the camera module 1000 during image capturing.

The guide portion 400 is accommodated in the carrier 300. The holder 220 is mounted on the guide portion 400. Ball members C serving as a rolling bearings are provided between the carrier 300 and the guide portion 400 in the optical axis direction, between the carrier 300 and the lens holder 220 in the optical axis direction, and between the guide portion 400 and the holder 220 in the optical axis direction.

The guide portion 400 is configured to guide the lens module 200 when the lens module 200 is moved in the first and second directions perpendicular to the optical axis direction.

As an example, the lens module 200 is moved in the first direction relative to the guide portion 400, and the guide portion 400 and the lens module 200 are moved together relative to the carrier 300 in the second direction.

The shaking correction portion includes a plurality of magnets 810a and 830a and a plurality of coils (a first OIS driving coil and a second OIS driving coil) 810b and 830b. In addition, the shaking correction portion includes a plurality of position sensors 810c and 830c, for example, Hall sensors, to sense positions of the lens module 200 in the first and second directions.

Among the plurality of magnets 810a and 830a and the plurality of coils 810b and 830b, one magnet 810a and one coil 810b are disposed to face each other in the first direction to generate a driving force in the first direction, and the other magnet 830a and the other coil 830b are disposed to face each other in the second direction to generate a driving force in the second direction.

The plurality of magnets 810a and 830a are mounted on the lens module 200, and the plurality of coils 810b and 830b and the plurality of position sensors 810c and 830c facing the plurality of magnets 810a and 830a are fixed to the housing 110. As an example, the plurality of coils 810b and 830b and the plurality of position sensors 810c and 830c are mounted on the substrate 900 and the substrate 900 is mounted on the housing 110.

The plurality of magnets 810a and 830a are movable members that move together with the lens module 200 in the first direction and the second direction, and the plurality of coils 810b and 830b and the plurality of position sensors 810c and 830c are fixed members fixed to the housing 110.

The ball members C are provided to support the guide portion 400 and the lens module 200. The ball members C serve to guide the guide portion 400 and the lens module 200 during shaking correction.

The ball members C are disposed between the carrier 300 and the guide portion 400, between the carrier 300 and the lens module 200, and between the guide portion 400 and the lens module 200.

When a driving force is generated in the first direction, the ball members C disposed between the carrier 300 and the guide portion 400 and between the carrier 300 and the lens module 200 roll in the first direction. Accordingly, the ball members C guide the movement of the guide portion 400 and the lens module 200 in the first direction.

When a driving force is generated in the second direction, the ball members C disposed between the guide portion 400 and the lens module 200 and between the carrier 300 and the lens module 200 roll in the second direction. Accordingly, the ball members C guide the movement of the lens module 200 in the second direction.

The lens module 200 and the carrier 300 are accommodated in the housing 110. As an example, the housing 110 has a form of a substantially square box having an open top and an open bottom, and has an internal space in which the lens module 200 and the carrier 300 are accommodated.

A printed circuit board (PCB) (not illustrated in FIGS. 1 to 3B) may be disposed below the housing 110.

The case 120 is coupled to the housing 110 to surround external surfaces of the housing 110, and protect internal components of the camera module 1000. In addition, the case 120 shields electromagnetic waves.

As an example, the case 120 shields electromagnetic waves generated by the camera module 1000 so that these electromagnetic waves do not affect other electronic components in the portable electronic device.

Furthermore, since other electronic components in addition to the camera module 1000 are mounted in the portable electronic device, the case 120 shields electromagnetic waves generated by the other electronic components so that these electromagnetic waves do not affect the camera module 1000.

The case 120 is made of a metal and is grounded to a ground pad (not illustrated in FIGS. 1 to 3B) provided on the printed circuit board. Thus, the case 120 shields electromagnetic waves.

The aperture module 500 is configured to selectively change an amount of light incident on the lens module 200.

As an example, the aperture module 500 includes a plurality of blades by which aperture holes having different sizes may be formed in a continuous manner. That is, the aperture holes are not limited to discrete sizes that are discontinuous from each other, but the size of the aperture hole may be continuously varied between a maximum size and a minimum size. Light is incident on the lens module 200 through one of the aperture holes having different sizes depending on a capturing environment.

Figure 4:
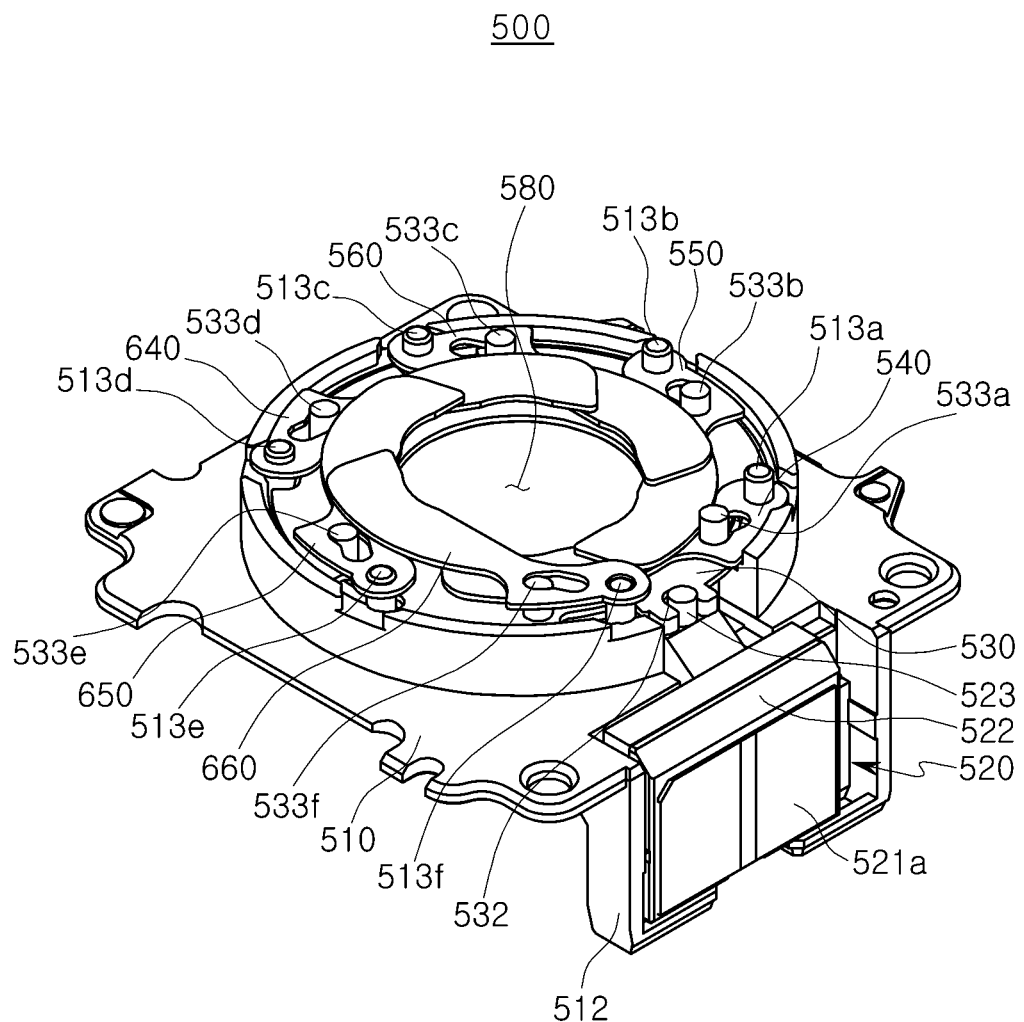
FIG. 4 is a perspective view of an example of an aperture module with a cover removed.
Figure 5:
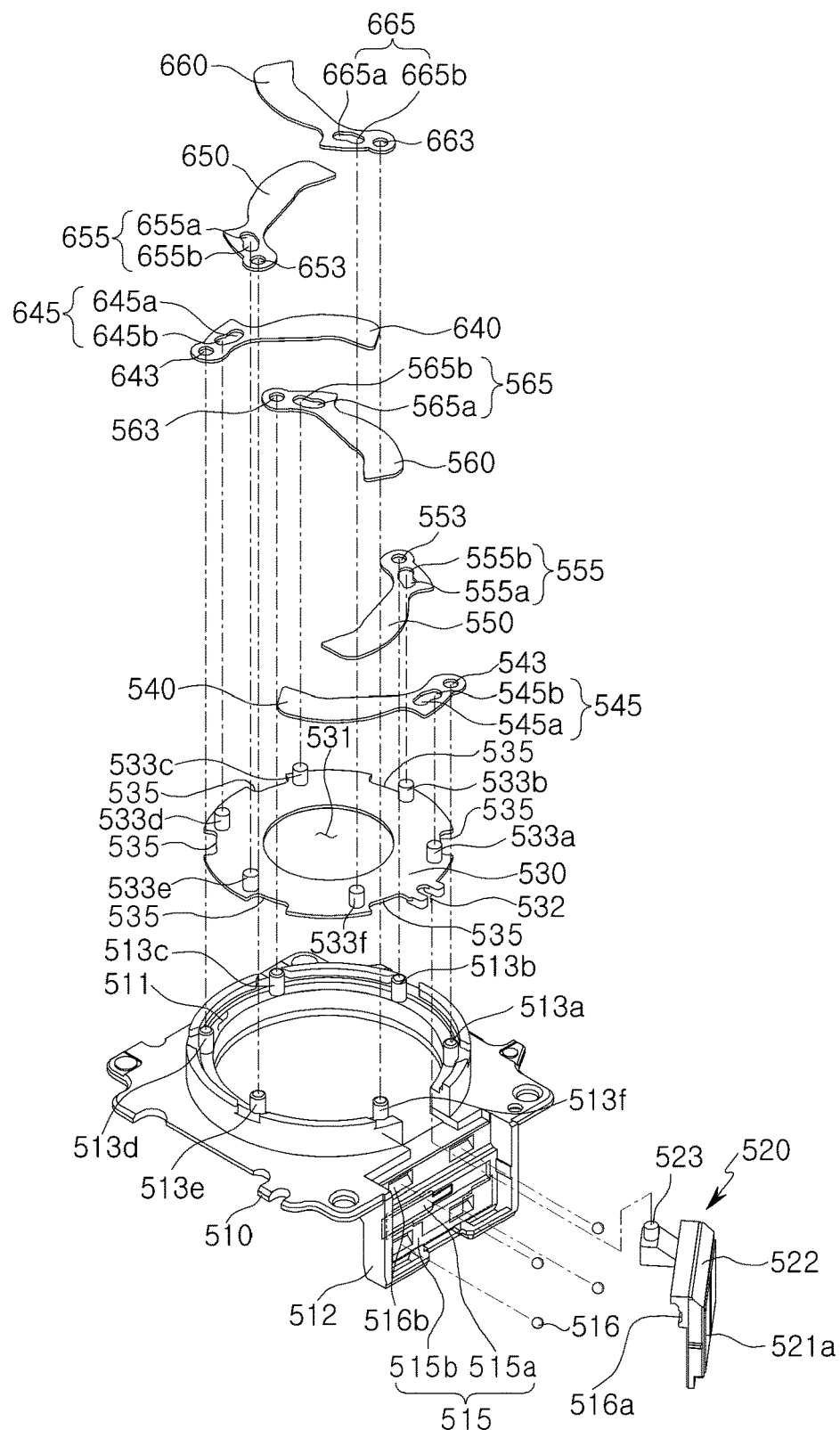
FIG. 5 is an exploded perspective view of the aperture module of FIG. 4.
Figure 6A:
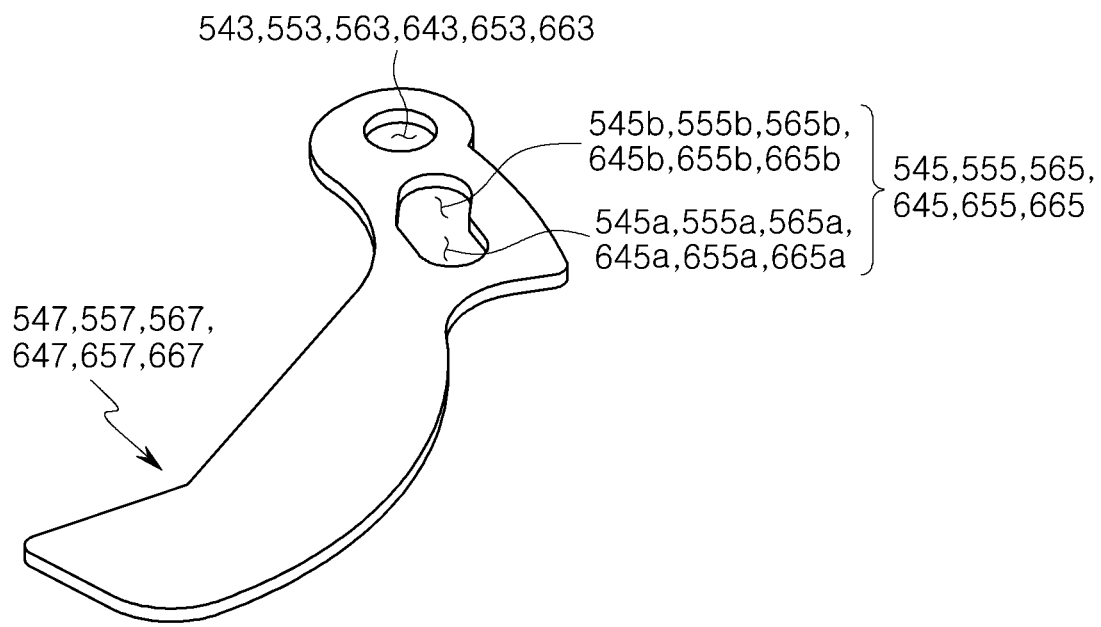
FIGS. 6A and 6B illustrate examples of a shape of blades of the aperture module of FIG. 4.
Figure 6B:
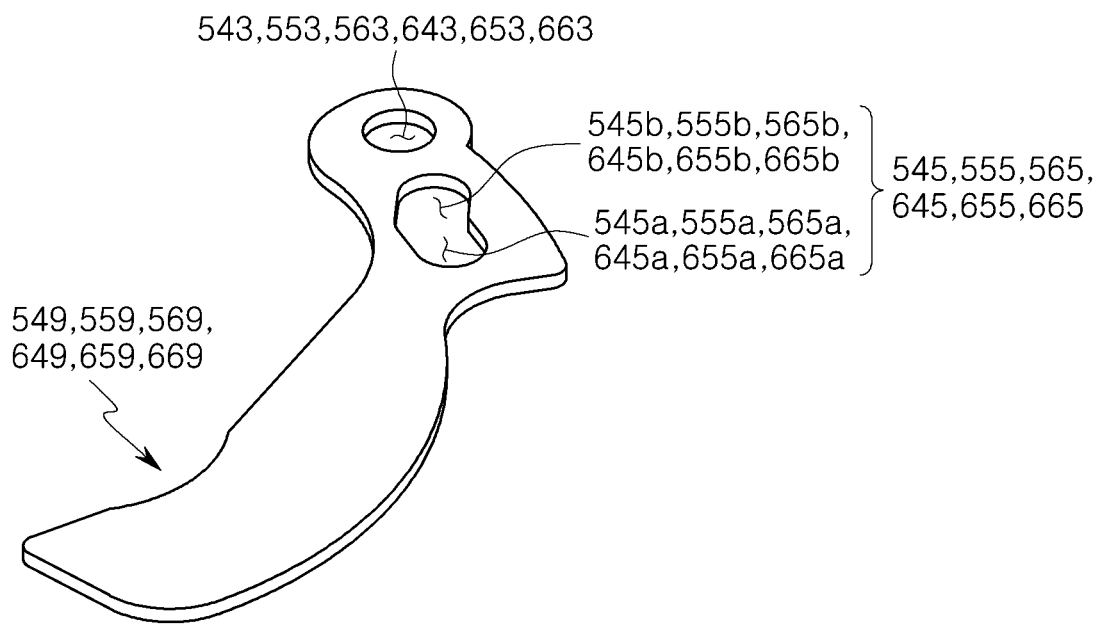
Figure 7:
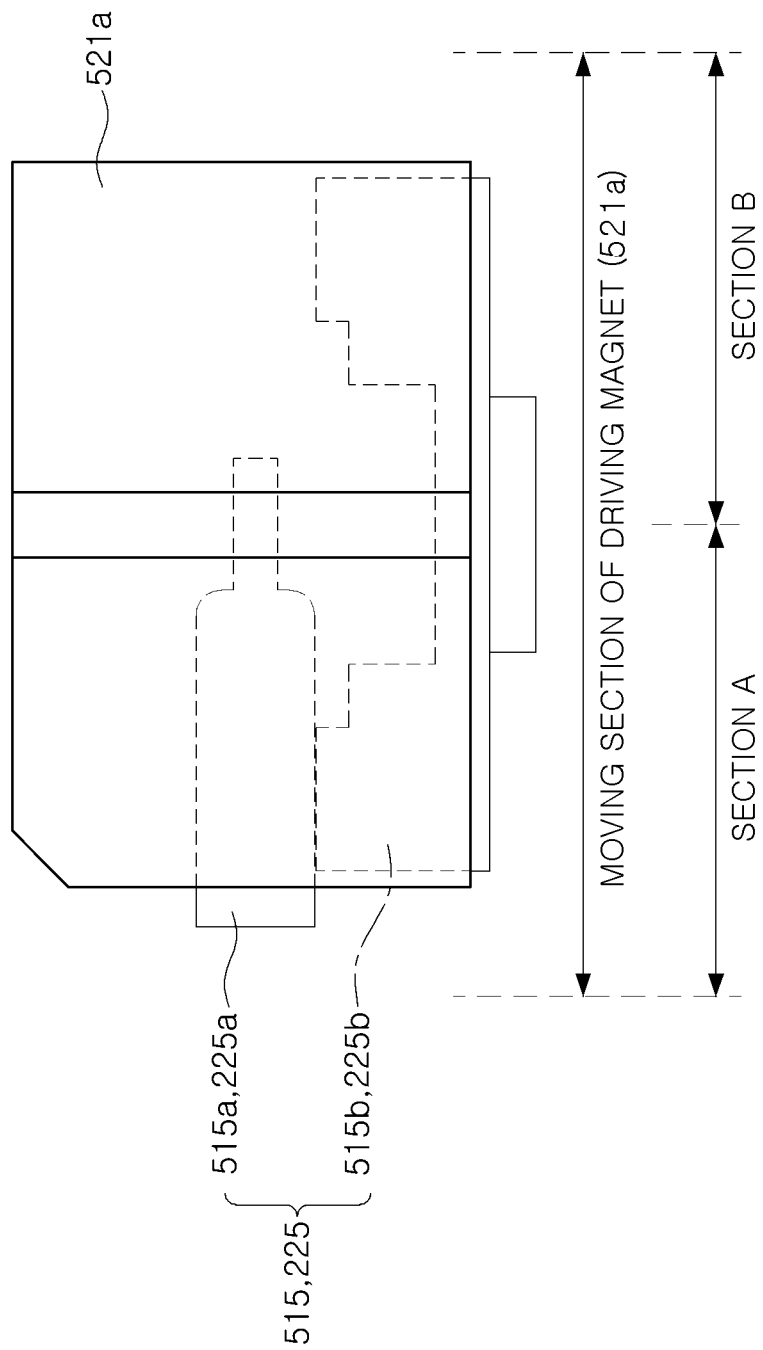
FIG. 7 illustrates an example of a positional relationship between a driving magnet and a yoke of the aperture module of FIG. 4.
Figure 8:
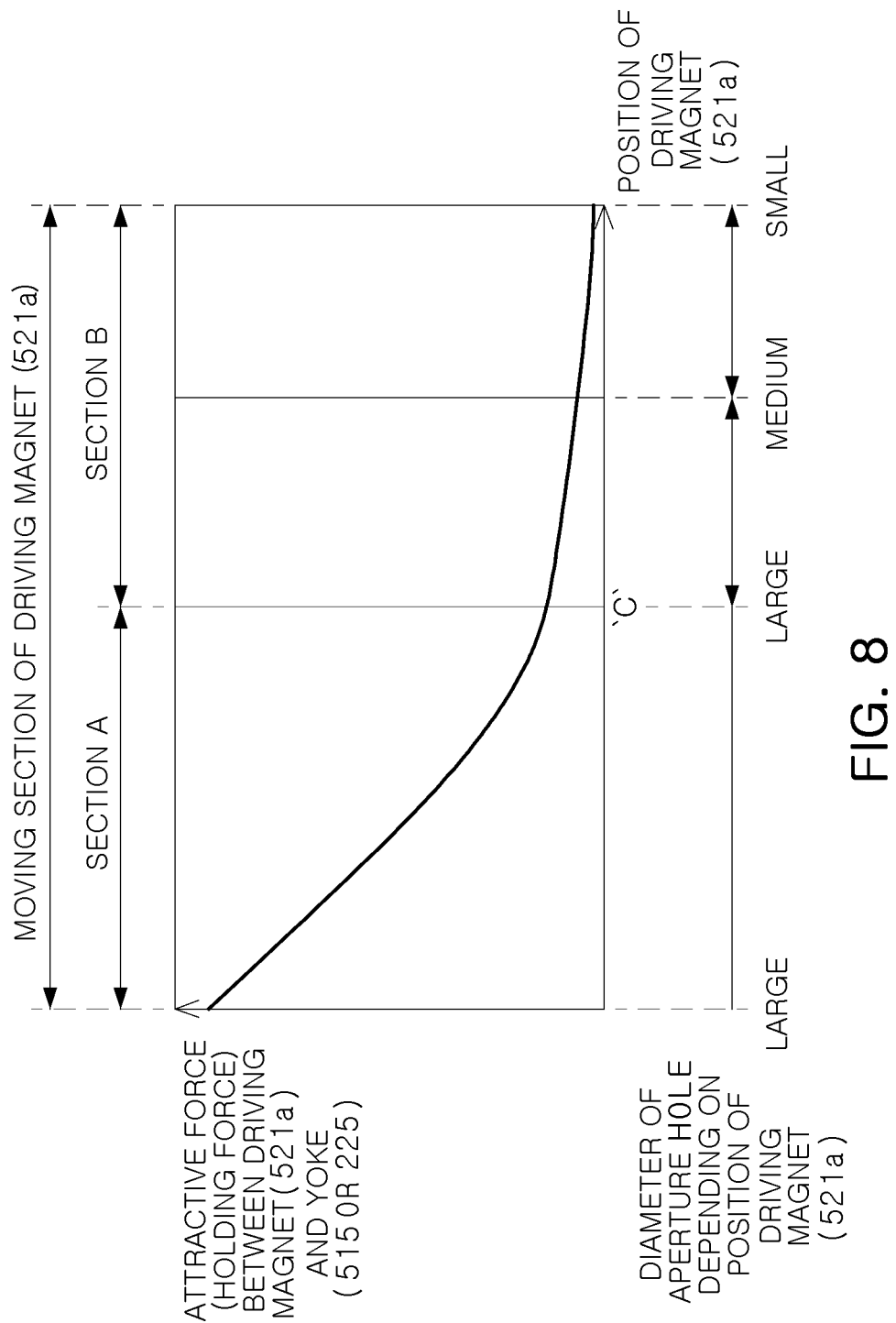
FIG. 8 is a reference diagram illustrating a change in an attractive force (holding force) between the driving magnet and the yoke of the aperture module of FIG. 4 depending on a positional relationship between the driving magnet and the yoke.

FIG. 4 is a perspective view of an example of an aperture module with a cover removed, FIG. 5 is an exploded perspective view of the aperture module of FIG. 4, FIGS. 6A and 6B illustrate examples of a shape of blades of the aperture module of FIG. 4, FIG. 7 illustrates an example of a positional relationship between a driving magnet and a yoke of the aperture module of FIG. 4, and FIG. 8 is a reference diagram illustrating a change in an attractive force (holding force) between the driving magnet and the yoke of the aperture module of FIG. 4 depending on a positional relationship between the driving magnet and the yoke.

Referring to FIGS. 4 and 5, an aperture module 500 is coupled to a lens module 200 and is configured to selectively change the amount of light incident on the lens module 200.

The aperture module 500 allows a relatively small amount of light to be incident on the lens module 200 in a high illumination environment, and allows a relatively large amount of light to be incident on the lens module 200 in a low illumination environment. Therefore, the aperture module 500 is able to maintain a constant image quality even in various illumination conditions.

The aperture module 500 is coupled to the lens module 200 to be moved together with the lens module 200 in an optical axis direction, a first direction, and a second direction. For example, the lens module 200 and the aperture module 500 are moved together during focusing and shaking correction so that a distance between the lens module 200 and the aperture module 500 is not changed.

Referring to FIGS. 4 and 5, the aperture module 500 includes a base 510, a plurality of blades 540, 550, 560, 640, 650, and 660, and an aperture driving portion, which includes a moving portion 520 including a driving magnet 521a and a driving coil 521b (see FIGS. 2, 3A, and 3B). In addition, the aperture module 500 includes a position sensor 521c, (see FIGS. 2, 3A, and 3B) for example, a Hall sensor, that precisely determines a position of the moving portion 520 to perform closed-loop control. In addition, the aperture module 500 includes a cover 590 (see FIG. 3A) covering the base 510 and the plurality of blades 540, 550, 560, 640, 650, and 660 and having a through-hole 571 (see FIG. 3A) through which light is incident.

The aperture module 500 includes first to sixth blades 540, 550, 560, 640, 650, and 660. Although six blades are illustrated in FIGS. 4 and 5, the aperture module 500 is not limited thereto, but is applicable to all cases in which the aperture module includes two or more blades.

Each of the first to sixth blades 540, 550, 560, 640, 650, and 660 has substantially a boomerang shape. The first to sixth blades 540, 550, 560, 640, 650, and 660 are disposed so that concave portions thereof face an optical axis, and thus form an overall round or polygonal aperture hole.

FIGS. 6A and 6B illustrate examples of shapes of a blade of an aperture module.

Referring to FIGS. 6A and 6B, the first to sixth blades 540, 550, 560, 640, 650, and 660 have V-shaped linear internal side portions 547, 557, 567, 647, 657, and 667 having a wide V shape (see FIG. 6A), or U-shaped curved internal side portions 549, 559, 569, 649, 659, and 669 having a wide U shape (see FIG. 6B).

When the first to sixth blades 540, 550, 560, 640, 650, and 660 have the V-shaped linear internal side portions 547, 557, 567, 647, 657, and 667, an aperture hole formed by overlapping the V-shaped linear internal side portions 547, 557, 567, 647, 657, and 667 is dodecagonal, that is, it has twelve sides. When the first to sixth blades 540, 550, 560, 640, 650, and 660 have the U-shaped curved internal side portions 549, 559, 569, 649, 659, and 669, an aperture hole formed by overlapping the U-shaped curved internal side portions 549, 559, 569, 649, 659, and 669 is substantially circular. A precise shape of the aperture hole is a shape in which straight lines and curves are combined (see, for example, FIGS. 9A to 9C), and since curved portions of the first to sixth blades 540, 550, 560, 640, 650, and 660 having the U-shaped curved internal side portions 549, 559, 569, 649, 659, and 669 form an aperture hole as a size of the aperture hole decreases, an aperture hole having a form of an ideal circle may be formed at small sizes of the aperture hole (see, for example, FIG. 9D).

FIGS. 9A to 9D illustrate an example in which the first to sixth blades 540, 550, 560, 640, 650, and 660 have the U-shaped curved internal side portions 549, 559, 569, 649, 659, and 669 illustrated in FIG. 6B.

In another example, an internal side portion of a blade forming an aperture hole may be rectilinear rather than angular as illustrated in FIG. 6A or concave as illustrated in FIG. 6B. In this case, the first to sixth blades 540, 550, 560, 640, 650, and 660 overlap each other to form a hexagonal aperture hole.

Since the first to sixth blades 540, 550, 560, 640, 650, and 660 are slidably moved while portions thereof are in contact with each other, the first to sixth blades 540, 550, 560, 640, 650, and 660 may be antistatically treated to prevent generation of frictional electricity.

The first to sixth blades 540, 550, 560, 640, 650, and 660 are linked to a rotation plate 530 to be driven. However, this is merely an example. Although not illustrated in the drawings, the first to sixth blades 540, 550, 560, 640, 650, and 660 may instead be directly linked to the moving portion 520, which is a driving portion, to be driven. To sum up, the first to sixth blades 540, 550, 560, 640, 650, and 660 may be directly linked to the moving portion 520, which is a driving portion, or may be indirectly linked to the moving portion 520 via the rotation plate 530.

The rotation plate 530 is linked to the moving portion 520, which linearly reciprocates in a direction perpendicular to the optical axis direction, and is rotated about the optical axis by converting a linear motion of the moving portion 520 into a rotational motion. A center of the rotation plate 530 has a through-hole 531 through which light passes, and the through-hole 531 has a size equal to or greater or smaller than a size of a maximum-sized aperture hole formed by the first to sixth blades 540, 550, 560, 640, 650, and 660. Since the rotation plate 530 moves while in contact with the first to sixth blades 540, 550, 560, 640, 650, and 660, the rotation plate 530 may be antistatically treated to prevent generation of frictional electricity.

The base 510 has a guide groove 511 to guide a rotational motion of the rotation plate 530, and the rotation plate 530 is inserted into the guide groove 511 to be rotated while being guided. The guide groove 511 has a circular edge, and has stationary shafts 513a, 513b, 513c, 513d, 513e, and 513f disposed on a bottom surface of the guide groove 511. The rotation plate 530 has a circular edge corresponding to the circular edge of the guide groove 511, and has avoidance grooves 535 to avoid interfering with the stationary shafts 513a, 513b, 513c, 513d, 513e, and 513f.

Even if the base 510 does not have the guide groove 511, a rotation may be naturally induced because driving shafts 533a, 533b, 533c, 533d, 533e, and 533f of the rotation plate 530 are inserted into the first to sixth blades 540, 550, 560, 640, 650, and 660, respectively.

The first to sixth blades 540, 550, 560, 640, 650, and 660 are driven by a linkage with the rotation plate 530 when the rotation plate 530 is rotating.

The first to sixth blades 540, 550, 560, 640, 650, and 660 have rotation shaft holes 543, 553, 563, 643, 653, and 663, respectively, and driving shaft holes 545, 555, 565, 645, 655, and 665, respectively. The rotation shaft holes 543, 553, 563, 643, 653, and 663 are rotatably fitted onto the stationary shafts 513a, 513b, 513c, 513d, 513e, and 513f, respectively, of the base 510. The driving shaft holes 545, 555, 565, 645, 655, and 665 are rotatably and movably fitted onto the driving shafts 533a, 533b, 533c, 533d, 533e, and 533f, respectively, of the rotation plate 530.

The rotation shaft holes 543, 553, 563, 643, 653, and 663, the driving shaft holes 545, 555, 565, 645, 655, and 665, and a guide hole 532 fitted onto the stationary shafts 513a, 513b, 513c, 513d, 513e, and 513f, the driving shafts 533a, 533b, 533c, 533d, 533e, and 533f, and a driving projection 523 of the moving portion 520 may have hole shapes or groove shapes even though the names of these elements include the word "hole" for ease of description.

Since the rotation shaft holes 543, 553, 563, 643, 653, and 663 of the first to sixth blades 540, 550, 560, 640, 650, and 660 have a circular shape, only rotation is possible while the rotation shaft holes 543, 553, 563, 643, 653, and 663 are fitted onto the stationary shafts 513a, 513b, 513c, 513d, 513e, and 513f.

The driving shaft holes 545, 555, 565, 645, 655, and 665 are elongated to enable the driving shafts 533a, 533b, 533c, 533d, 533e, and 533f to be move along the driving shaft holes 545, 555, 565, 645, 655, and 665 while the driving shaft holes 545, 555, 565, 645, 655, and 665 are fitted onto the driving shafts 533a, 533b, 533c, 533d, 533e, and 533f. The driving shaft holes 545, 555, 565, 645, 655, and 665 are formed so that first sections 545a, 555a, 565a, 645a, 655a, and 665a of the driving shaft holes 545, 555, 565, 645, 655, and 665 oriented parallel to a rotation direction of the rotation plate 530, and second sections 545b, 555b, 565b, 645b, 655b, and 665b of the driving shaft holes 545, 555, 565, 645, 655, and 665 inclined to the rotation direction of the rotation plate 530, communicate with each other. For example, each of the driving shaft holes 545, 555, 565, 645, 655, and 665 has a form of a V-shaped groove or hole in which the first sections 545a, 555a, 565a, 645a, 655a, and 665a and the second sections 545b, 555b, 565b, 645b, 655b, and 665b communicate with each other.

Since the first sections (fixed sections) 545a, 555a, 565a, 645a, 655a, and 665a are preparation sections in which an inclination of each hole is approximately parallel to the rotation direction of the rotation plate 530, the driving shafts 533a, 533b, 533c, 533d, 533e, and 533f merely move along the first sections 545a, 555a, 565a, 645a, 655a, and 665a and do not rotate the first to sixth blades 540, 550, 560, 640, 650, and 660 even when the rotation plate 530 rotates. For example, on the basis of the first to sixth blades 540, 550, 560, 640, 650, and 660, the first sections 545a, 555a, 565a, 645a, 655a, and 665a are sections in which the rotation plate 530 is idle.

Since the second sections 545b, 555b, 565b, 645b, 655b, and 665b are driving sections in which each hole is inclined to the rotation direction of the rotation plate 530, the driving shafts 533a, 533b, 533c, 533d, 533e, and 533f are rotated with the rotation of the rotation plate 530 to contract or extend the first to sixth blades 540, 550, 560, 640, 650, and 660 while moving along the second sections 545b, 555b, 565b, 645b, 655b, and 665b.

As a result, when the moving portion 520 moves from an end position on one side to an end portion on an opposite side, the rotation plate 530 continues to be rotated, but the first to sixth blades 540, 550, 560, 640, 650, and 660 connected to the rotation plate 530 are not rotated when the driving shafts 533a, 533b, 533c, 533d, 533e, and 533f move along the first sections 545a, 555a, 565a, 645a, 655a, and 665a and are rotated only when the driving shafts 533a, 533b, 533c, 533d, 533e, and 533f move along the second sections 545b, 555b, 565b, 645b, 655b, and 665b.

Accordingly, as the rotation plate 530 is rotated, the driving shafts 533a, 533b, 533c, 533d, 533e, and 533f are rotated, and the first to sixth shafts 540, 550, 560, 640, 650, and 660 are inwardly contracted or outwardly extended to form aperture holes having various sizes in multiple stages or continuously while the driving shafts 533a, 533b, 533c, 533d, 533e, and 533f fitted in the driving holes 545, 555, 565, 645, 655, and 665 of the first to sixth blades 540, 550, 560, 640, 650, and 660 move along the second sections 545b, 555b, 565b, 645b, 655b, and 665b.

In the example illustrated in FIGS. 4 and 5, the first to sixth blades 540, 550, 560, 640, 650, and 660 are linked to the rotation plate 530. Therefore, when the moving portion 520 is linearly moved by an electromagnetic interaction between the driving magnet 521a and the driving coil 521b, the rotation plate 530 is rotated. As a result, the first to sixth blades 540, 550, 560, 640, 650, and 660 are moved to change a diameter of an aperture hole.

As described above, the driving holes 545, 555, 565, 645, 655, and 665 of the first to sixth blades 540, 550, 560, 640, 650, and 660 have the first sections 545a, 555a, 565a, 645a, 655a, and 665a and the second sections 545b, 555b, 565b, 645b, 655b, and 665b. Therefore, although the rotation plate 530 is rotated, the first to sixth blades 540, 550, 560, 640, 650, and 660 are prevented from moving when the driving shafts 533a, 533b, 533c, 533d, 533e, and 533f are moving in the first sections 545a, 555a, 565a, 645a, 655a, and 665a.

In another example (not illustrated in FIGS. 4 and 5), the guide hole 532 of the rotation plate 530 has third and fourth sections respectively corresponding to the first and second sections of the first to sixth blades 540, 550, 560, 640, 650, and 660 so that the rotation plate 530 is not rotated when the driving projection 523 of the moving portion 520 moves in the third section of the guide hole 532, and is rotated when the driving projection 523 moves in the fourth section of the guide hole 532.

For example, the guide hole 532 has a bent shape formed by the third and fourth sections in which the third section is elongated and oriented parallel to a moving direction of the moving portion 520, and the fourth section is elongated and oriented inclined to the moving direction of the moving portion 520. The number of the stationary shafts 513a, 513b, 513c, 513d, 513e, and 513f of the base 510 is equal to the number of the first to sixth blades 540, 550, 560, 640, 650, and 660. The stationary shafts 513a, 513b, 513c, 513d, 513e, and 513f are sequentially disposed to form a regular polygon. For example, the stationary shafts 513a, 513b, 513c, 513d, 513e, and 513f are sequentially disposed at regular intervals along the circumference of a predetermined circle. As in the example illustrated in FIGS. 4 and 5, when the first to sixth blades 540, 550, 560, 640, 650, and 660 are provided, the stationary shafts 513a, 513b, 513c, 513d, 513e, and 513f are sequentially disposed along the circumference of a predetermined circle to form a regular hexagon.

For example, the first to sixth blades 540, 550, 560, 640, 650, and 660 are disposed in a circumferential direction to form an aperture hole. In addition, the first to sixth blades 540, 550, 560, 640, 650, and 660 are inwardly contracted or outwardly extended to successively form aperture holes 580 having various sizes. The aperture holes may have a round shape, a polygonal shape, or a shape having a circumference in which straight lines and curves are combined, conforming to shapes of internal side portions of the first to sixth blades 540, 550, 560, 640, 650, and 660, such as a V-shape as illustrated in FIG. 6A or a U-shape as illustrated in FIG. 6B.

Accordingly, light may be incident through any one of the aperture holes having various sizes depending on a capturing environment.

The aperture driving portion includes the moving portion 520 disposed on the base 510 to be movable along one axis and including the magnet 521a and the driving coil 521b fixed to the housing 110 to oppose the magnet 521a.

The driving coil 521b is mounted on the substrate 900, and the substrate 900 is mounted on the housing 110. The substrate 900 may be electrically connected to a printed circuit board (PCB) (not illustrated in FIGS. 1 to 6) disposed below the camera module 1000.

The moving portion 520 is a movable member moving in the optical axis direction, the first direction, and the second direction together with the base 510, while the driving coil 521b is a fixed member fixed to the housing 110.

Since the driving coil 521b providing a driving force to the aperture module 500 is disposed outside the aperture module 500, for example, in the housing 110 of the camera module 1000, a weight of the aperture module 500 is decreased.

For example, since the driving coil 521b providing a driving force to the aperture module 500 is provided as a fixed member, the driving coil 521b is not moved when an autofocusing (AF) or optical image stabilization (OIS) function of the camera module 1000 is performed. Thus, an increase in a weight of lens module 200 caused by the addition of the aperture module 500 is significantly reduced.

In addition, since the driving coil 521b providing a driving force to the aperture module 500 is disposed in the housing 110 to be electrically connected to a PCB (not illustrated) disposed below the camera module 1000, the driving coil 521b of the aperture driving portion is not affected even when the lens module 200 and the aperture module 500 are moved when the AF or OIS function of the camera module 1000 is performed.

As a result, a degradation in the AF function of the camera module 1000 is prevented.

In the example illustrated in FIGS. 4 and 5, since a size of the aperture hole 580 may be continuously changed, a position of the moving portion 520 needs to be precisely sensed to precisely set the size of the aperture hole 580. Accordingly, the position sensor 521c disposed to oppose the driving magnet 521a of the moving portion 520 is provided to determine a position of the driving magnet 521a. The position sensor 521c may be a Hall sensor and may be mounted in the center of the driving coil 521b or adjacent to the driving coil 521b. For example, the position sensor 521c may be mounted on the substrate 900 together with the driving coil 521b.

In the example illustrated in FIGS. 4 and 5, when the moving portion 520 is linearly moved, a closed-loop control is used to sense and feed back a position of the moving portion 520. Hence, the position sensor 521c is required for the closed-loop control.

The substrate 900 is provided with a gyrosensor (not illustrated) configured to detect shaking factors such as a user's hand shaking and other motions of the camera module 1000, and a driver integrated circuit (IC) (not illustrated) configured to provide driving signals to the coils 810b, 830b, 730, and 521b.

The base 510 includes a moving guide 512 in which the moving portion 520 is disposed. The moving guide 512 has a shape extending away from the base 510 in the optical axis direction.

The moving portion 520 includes the driving magnet 521a disposed to face the driving coil 521b, and a magnet holder 522 to which the driving magnet 521a is coupled. The driving magnet 521a is disposed to oppose the driving coil 521b in a direction perpendicular to the driving coil 521b.

The moving portion 520 is moved while in tight contact with the moving guide 512 of the base 510. Accordingly, the driving guide 512 is provided with a yoke 515 so that the moving portion 520 is brought into tight contact with the moving guide 512 by an attractive force with the driving magnet 521a of the moving portion 520. Alternatively, a yoke 225 (see FIG. 2) is provided on the lens holder 220 of the lens module 200 at a position corresponding to the moving portion 520. The moving portion 520 is slidably moved by an interaction between the driving magnet 521a and the driving coil 521b while the moving portion 520 is held in a state of tight contact with the moving guide 512 by an attractive force between the yoke 515 or 225 and the driving magnet 521a.

The aperture module 500 may be maintained in a fixed state by moving the moving portion 520 to a predetermined position when power is not applied to the driving coil 521b. Thus, a structure of the yoke 515 provided on the moving guide 512, or the yoke 225 provided on the lens module 200, is designed so that an attractive force (holding force) between the yoke 515 or 225 and the driving magnet 521a is greater when the moving portion 520 is disposed at one position than when the moving portion 520 is disposed at another position.

Referring to FIG. 7, the yoke 515 or 225 is provided with an additional magnetic portion 515a or 225a on the left side of the yoke 515 or 225 so that there is a greater amount of magnetic material on a left side of the yoke 515 or 225 than on a right side of the yoke 515 or 225. For example, the yoke 515 and 225 may be provided on only one side by providing only the additional magnetic portion 515a or 225a on only the one side, or a main yoke 515b or 225b may be provided extending from one side to the other side and the additional magnetic portion 515a or 225a may be additionally provided on the one side as illustrated in FIG. 7.

Accordingly, for example, in a case in which the yoke 515 or 225 have a greater amount of magnetic material on the left side, the attractive force (holding force) between the yoke 515 or 225 and the driving magnet 521a is greatest at a left end position of the moving portion 520, so the moving portion 520 is automatically moved to the left end position by the attractive force (holding force) when power is not applied in a case in which a center of the moving portion 520, for example, a center of the driving magnet 521a, is disposed in a section A (a fixed section). However, in the case in which the center of the moving portion 520, for example, the center of the driving magnet 521a, is disposed in a section B (a driving section), the attractive force (holding force) between the driving magnet 521a and the yoke 515 or 225 is not strong enough to move the moving portion 520 when power is not applied. Thus, the moving portion 520 is maintained in a state of being fixed at a predetermined position of the section B without moving to the left end position. This will be described below detail.

The first to sixth blades 540, 550, 560, 640, 650, and 660 of the aperture module 100 are not rotated when the driving shafts 533a, 533b, 533c, 533d, 533e, and 533f move along the first sections 545a, 555a, 565a, 645a, 655a, and 665a, and are rotated only when the driving shafts 533a, 533b, 533c, 533d, 533e, and 533f move along the second sections 545b, 555b, 565b, 645b, 655b, and 665b. Accordingly, substantial driving of the first to sixth blades 540, 550, 560, 640, 650, 660 occurs only when the driving shafts 533a, 533*b*, 533*c*, 533*d*, 533*e*, and 533*f* move along the second sections 545*b*, 555*b*, 565*b*, 645*b*, 655*b*, and 665*b*.

This results in a significantly improved effect in relation to structures of the yoke 515 or 225 including the additional magnetic portion 515*a* or 225*a*, so that a difference in an attractive force (holding force) arises between the driving magnet 521*a* and the yoke 515 or 225 when the driving magnet 521*a* is positioned on one side and when the driving magnet 521*a* is positioned on the other side.

As illustrated in FIGS. 7 and 8, in the case of the yoke 515 or 225 having a greater amount of magnetic material on the left side (in section A), an attractive force (holding force) between the driving magnet 521*a* and the yoke 515 or 225 generated when the center of the driving magnet 521*a* is located in the section A is greater than an attractive force (holding force) between the driving magnet 521*a* and the yoke 515 or 225 generated when the center of the driving magnet 521*a* is located in the section B. Therefore, since the attractive force (holding force) is smaller when the center of the driving magnet 521*a* is located in the section B rather than in the section A, a smaller amount of current is consumed to drive the moving portion 520 in the section B.

In addition, as illustrated in FIG. 8, the attractive force (holding force) between the driving magnet 521*a* and the yoke 515 or 225 is rapidly reduced when the center of the driving magnet 521*a* passes the position C, for example, in the case of the structure in FIG. 7. Therefore, after the center of the driving magnet 521*a* passes the position C, the driving shafts 533*a*, 533*b*, 533*c*, 533*d*, 533*e*, and 533*f* change a size of an aperture hole while moving along the second sections 545*b*, 555*b*, 565*b*, 645*b*, 655*b*, and 665*b*. As a result, an amount of current consumed to drive the aperture module 500 is significantly reduced.

Further, after the center of the driving magnet 521*a* passes the position C, the attractive force (holding force) between the driving magnet 521*a* and the yoke 515 or 225 becomes less than a maximum static frictional force of the moving portion 520, which is a maximum force required to move the moving portion 520 in a static state, and thus the attractive force (holding force) is so small that the moving portion 520 cannot be pulled back to the left end position by the attractive force (holding force). Therefore, even when there is no power applied to the driving coil 521*b*, the moving portion 520 is fixed to a predetermined position (or any position) of the section B without moving. That is, the moving portion 520 stays at whatever position it was located at in the section B when the power is removed from the driving coil 521*a*. Accordingly, when a diameter of the aperture hole is determined while the aperture module 500 is continuously changing the diameter of the aperture hole, the power is removed from the driving coil 521*a* so that the position of the moving portion 520 is fixed to maintain the determined diameter of the aperture hole. As a result, since it is unnecessary to continuously supply power to the driving coil 521*a* to maintain the determined diameter of the aperture hole, power consumption is significantly reduced.

For example, even when power is not applied to the driving coil 521*b*, the moving portion 520 is maintained at a fixed position in the second section B in which the attractive force (holding force) is smaller than a maximum static frictional force of the moving portion 520, which is a maximum force required to move the moving portion 520 in a static state, and is a force required to move the moving portion 520 in consideration of an attractive force with physically and magnetically connected members i.e., the rotation plate 530, the first to sixth blades 540, 550, 560, 640, 650, and 660, and the yoke 515 or 225. Accordingly, in the example illustrated in FIGS. 4, 5, 6B, 7, and 8, the first sections 545*a*, 555*a*, 565*a*, 645*a*, 655*a*, and 665*a* of the first to sixth blades 540, 550, 560, 640, 650, and 660 corresponding to the section A, and the second sections 545*b*, 555*b*, 565*b*, 645*b*, 655*b*, and 665*b* of the first to sixth blades 540, 550, 560, 640, 650, and 660 correspond to the section B. For example, the driving shafts 533*a*, 533*b*, 533*c*, 533*d*, 533*e*, and 533*f* move along the first sections 545*a*, 555*a*, 565*a*, 645*a*, 655*a*, and 665*a* as the driving magnet 521*a* moves along the section A, and move along the second sections 545*b*, 555*b*, 565*b*, 645*b*, 655*b*, and 665*b* as the driving magnet 521*a* moves along the section B.

In another example, the first sections 545*a*, 555*a*, 565*a*, 645*a*, 655*a*, and 665*a* of the driving shaft holes 545, 555, 565, 645, 655, and 665 that are oriented parallel to the rotation direction of the rotation plate 530 may be omitted so that the driving shaft holes 545, 555, 565, 645, 655, and 665 contain only the second sections 545*b*, 555*b*, 565*b*, 645*b*, 655*b*, and 665*b* that are inclined to the rotation direction of the rotation plate 530. In this case, the driving shaft holes 545, 555, 565, 645, 655, and 665 include a section in which the attractive force (holding force) applied to the moving portion 520 is smaller than the maximum static frictional force of the moving portion 520 referred to above. Accordingly, even when power is not applied to the driving coil 521*b*, the moving portion 520 is maintained in a fixed state in the section in which the attractive force (holding force) is smaller than the maximum static frictional force of the moving portion 520.

The base 510 is provided with bearings to allow the moving portion 520 to slide easily. For example, as illustrated in FIG. 5, ball bearings 516 are provided between the moving portion 520 and the moving guide 512, and the moving portion 520 and the moving guide 512 are provided with seating grooves 516*a* and 516*b*, respectively, in which the ball bearings 516 are respectively seated. However, the ball bearings are only an example, and other bearings in the form of, for example, a rod or a plate that is easily slidable may be used instead.

When power is applied to the driving coil 521*b*, the moving portion 520 is moved in a direction perpendicular to the optical axis direction by an electromagnetic interaction between the driving magnet 521*a* and the driving coil 521*b*.

The base 510 is provided with the a guide groove 511 to guide a rotational motion of the rotation plate 530, and the rotation plate 530 is inserted into the guide groove 511 to be rotated while being guided.

The rotation plate 530 is provided with the guide hole 532. The guide hole 532 is elongated in a direction perpendicular to the moving direction of the moving portion 520. The guide hole 532 may be in the form of a hole or a groove. In the example illustrated in FIGS. 4 and 5, the guide hole 532 is in the form of a groove having one open side.

Accordingly, when the moving portion 520 is moved along one axis, the driving projection 523 provided on the moving portion 520 moves within the guide hole 532, the rotation plate 530 is rotated in the guide grove 511 according to the movement of the driving projection 523, and a size of the aperture hole 580 is changed in multiple stages or continuously while the first to sixth blades 540, 550, 560, 640, 650, and 660 linked with the rotation plate 520 are contracted or extended (see FIGS. 9A to 9D).

FIGS. 9A to 9D illustrate examples of how a size of an aperture hole changes as a moving portion of the aperture module of FIG. 4 moves to different positions.

Figure 9A:
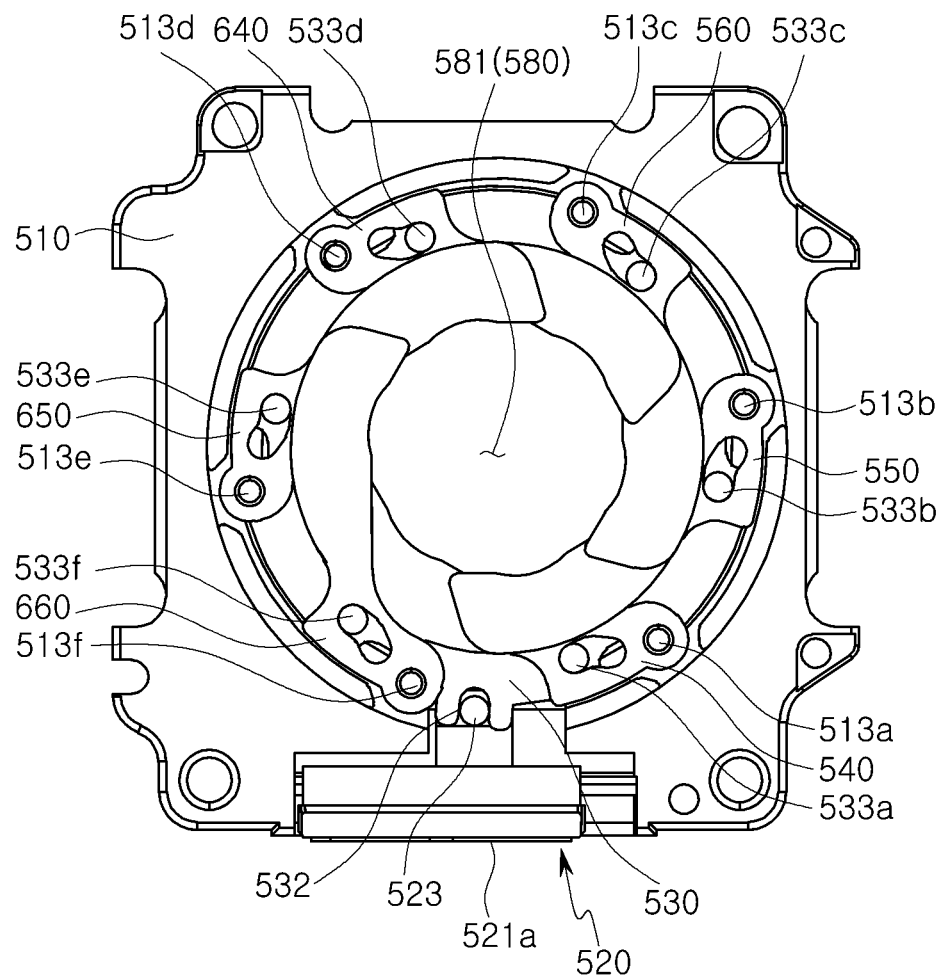
FIGS. 9A to 9D illustrate examples of how a size of an aperture hole changes as a moving portion of the aperture module of FIG. 4 moves to different positions.

FIG. 9A illustrates a case in which the moving portion 520 is located at a left end position at which the driving shafts 533a, 533b, 533c, 533d, 533e, and 533f are located at an end of the first sections 545a, 555a, 565a, 645a, 655a, and 665a located farthest away from the second sections 545b, 555b, 565b, 645b, 655b, and 665b, and the first to sixth blades 540, 550, 560, 640, 650, and 660 have not been rotated and form a largest-side aperture hole 581.

Figure 9B:
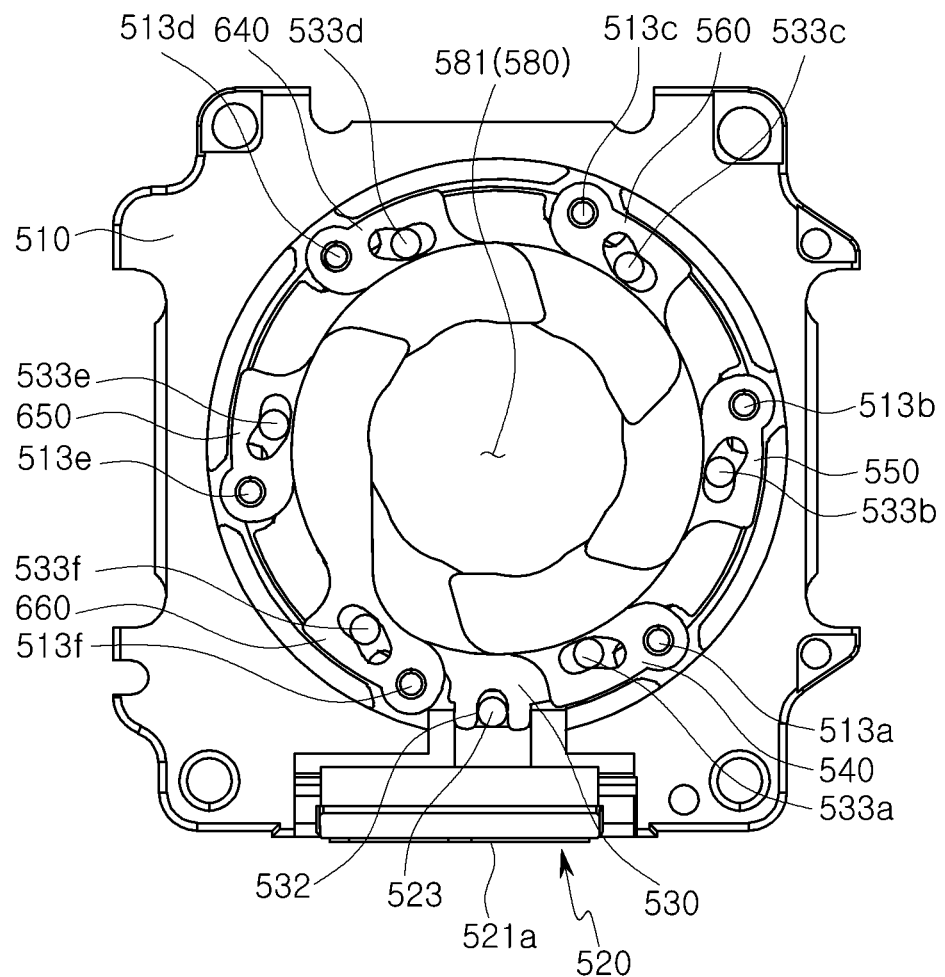

FIG. 9B illustrates a case in which the moving portion 520 has been moved to a position at which the driving shafts 533a, 533b, 533c, 533d, 533e, and 533f are located between the first sections 545a, 555a, 565a, 645a, 655a, and 665a and the second sections 545b, 555b, 565b, 645b, 655b, and 665b, and the first to sixth blades 540, 550, 560, 640, 650, and 660 still have not been rotated and still form the largest-side aperture hole 581.

As described above, the first to sixth blades 540, 550, 560, 640, 650, and 660 connected to the rotation plate 530 are not rotated when the driving shafts 533a, 533b, 533c, 533d, 533e, and 533f move along the first sections 545a, 555a, 565a, 645a, 655a, and 665a because a rotation direction of the rotation plate 530 and an inclination direction of the first sections 545a, 555a, 565a, 645a, 655a, and 665a are approximately the same. Therefore, a size of the aperture hole 580 is not changed and the largest-sized aperture hole 581 is maintained when the moving portion 520 moves from the position illustrated in FIG. 9A to the position illustrated in FIG. 9B.

Figure 9C:
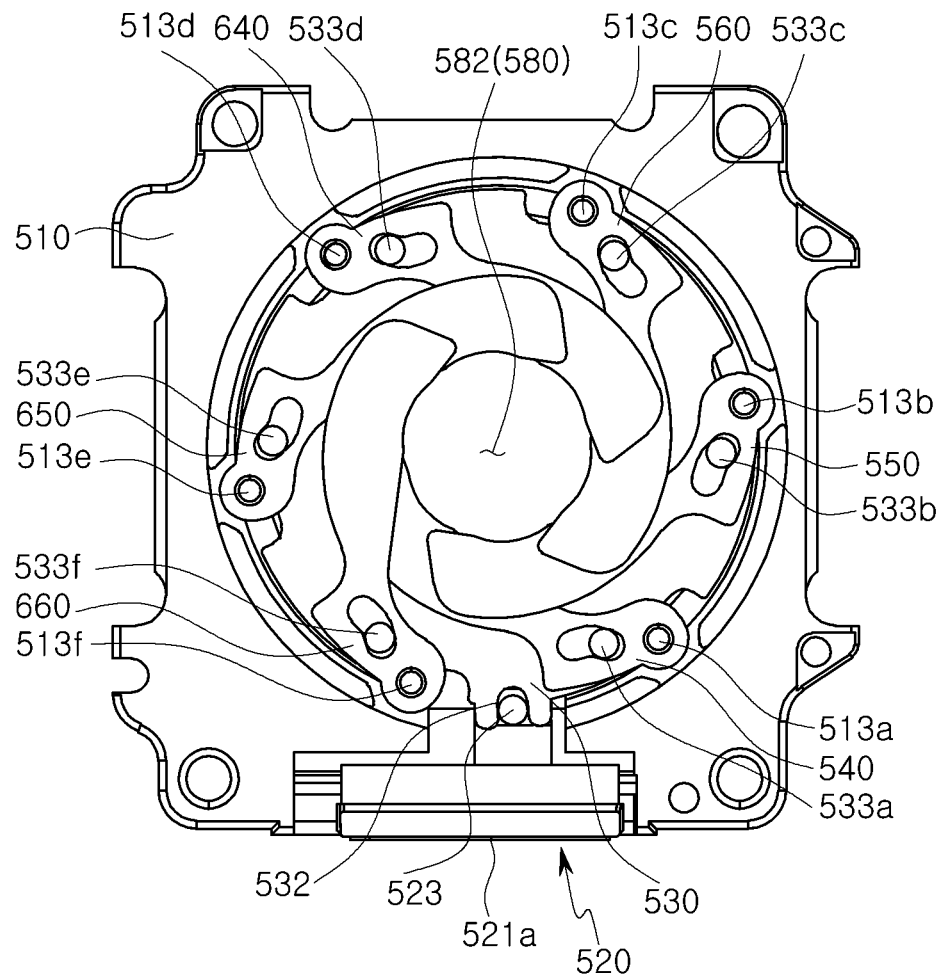

FIG. 9C illustrates a case in which the moving portion 520 has moved to a position at which the driving shafts 533a, 533b, 533c, 533d, 533e, and 533f are located at an approximate halfway position of the second sections 545b, 555b, 565b, 645b, 655b, and 665b. Since a rotation direction of the rotation plate 530 and an inclination direction of the second sections 545b, 555b, 565b, 645b, 655b, and 665b are different from each other, the first to sixth blades 540, 550, 560, 640, 650, and 660 have been rotated to form a medium-sized aperture hole 582.

Figure 9D:
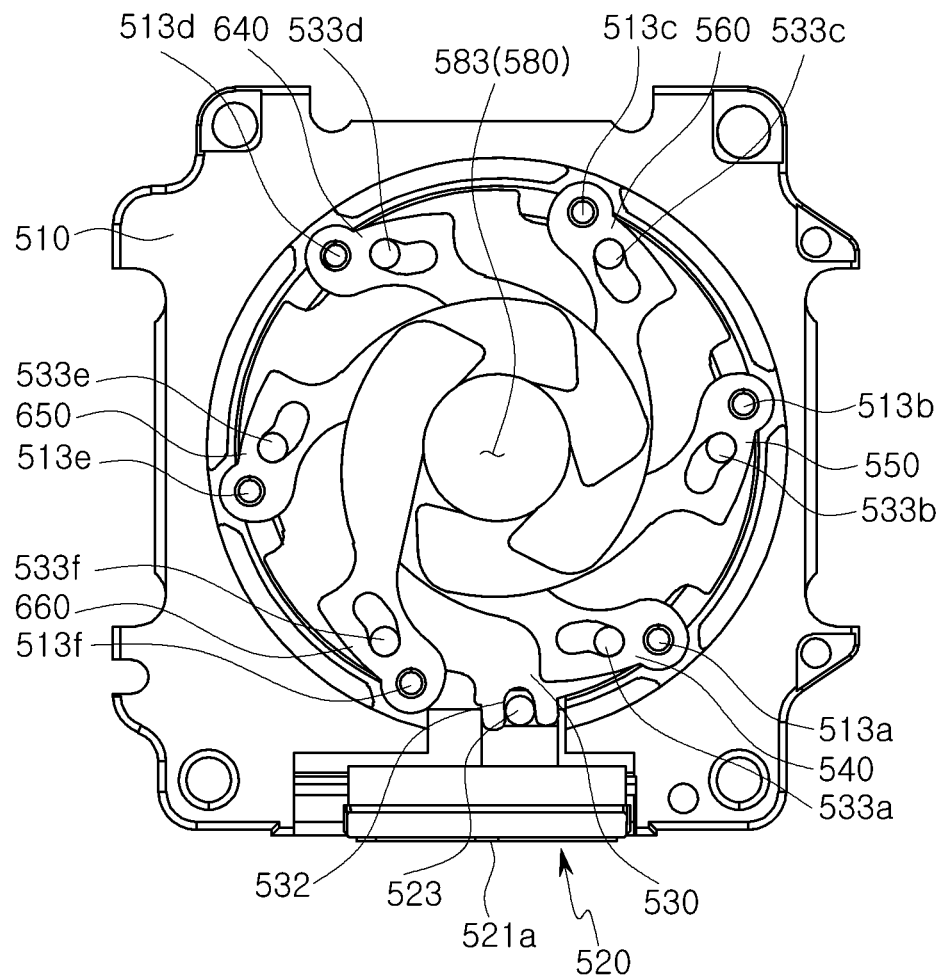

FIG. 9D illustrates a case in which the moving portion 520 has moved to a right end position at which the driving shafts 533a, 533b, 533c, 533d, 533e, and 533f are located at an end of the second sections 545b, 555b, 565b, 645b, 655b, and 665b located farthest away from the first sections 545a, 555a, 565a, 645a, 655a, and 665a. Since a rotation direction of the rotation plate 530 and an inclination direction of the second sections 545b, 555b, 565b, 645b, 655b, and 665b are different from each other, the first to sixth blades 540, 550, 560, 640, 650, and 660 have been further rotated to form a smallest-sized aperture hole 582.

As the moving portion 520 returns to the left end position illustrated in FIG. 9A after moving from the left end position to the right end position illustrated in FIG. 9D, the first to sixth blades 540, 550, 560, 640, 650, and 660 rotate to change the size of the aperture hole 580 back to the largest-sized aperture hole 581, although the rotation of the first to sixth blades 540, 550, 560, 640, 650, and 660 stops when the moving portion 520 reaches the position illustrated in FIG. 9B.

As the moving portion 520 moves between the position illustrated in FIG. 9B and the right end position illustrated in FIG. 9D, the first to sixth blades 540, 550, 560, 640, 650, and 660 rotate to change the size of the aperture hole 580 to a size between the size of the largest-sized aperture hole 581 and the size of the smallest-sized aperture hole 583.

As described above, the aperture module 500 enables various-sized aperture holes to be implemented by the rectilinear reciprocating motion of the moving portion 520.

The aperture module 500 described above includes the 515 or 225 having the structure illustrated in FIG. 7, and may be controlled as described below.

Before current is applied to the driving coil 521b, the moving portion 520 is held at the left end position illustrated in FIG. 9A, corresponding to a left side of the section A illustrated in FIG. 7, by an attractive force (holding force between the driving magnet 521a and the yoke 515 or 225.

To adjust a size of the aperture hole 580, a sufficient amount of current is applied to the driving coil 521b to move the moving portion 520 so that the center of the driving magnet 521a moves to the boundary between the section A and the section B illustrated in FIG. 7, corresponding to the position C illustrated in FIG. 8 and the position illustrated in FIG. 9B. At this position of the driving magnet 521a, the driving shafts 533a, 533b, 533c, 533d, 533e, and 533f are located at the boundary between the first sections 545a, 555a, 565a, 645a, 655a, and 665a and the second sections 545b, 555b, 565b, 645b, 655b, and 665b, which is a substantial aperture hole change start position of the aperture module 500, that is, a position at which the size of the aperture hole 580 starts to change as the driving magnet 521a continues to move.

While the driving shafts 533a, 533b, 533c, 533d, 533e, and 533f are passing through the first sections 545a, 555a, 565a, 645a, 655a, and 665a, the first to sixth blades 540, 550, 560, 640, 650, and 660 are not rotated and the size of the aperture hole 580 does not change, but remains at the maximum-sized aperture hole 581 as illustrated in FIGS. 9A and 9B.

As the driving magnet 521a continues to move and enters the section B illustrated in FIG. 7, the driving shafts 533a, 533b, 533c, 533d, 533e, and 533f enter the second sections 545b, 555b, 565b, 645b, 655b, and 665b after passing through the first sections 545a, 555a, 565a, 645a, 655a, and 665a, and an amount of current required by the driving coil 521b to move the driving magnet 521a is rapidly reduced. Therefore, the current applied to the driving coil 521a may be reduced.

The current applied to the driving coil 521b is adjusted to obtain an aperture hole 580 having a desired size in accordance with the relationship illustrated in FIG. 8.

When the current applied to the driving coil 521b is turned off, the driving magnet 521a is automatically moved to the left end position illustrated in FIG. 9A by the attractive force (holding force) between the driving magnet 521a and the yoke 515 or 225 if the center of the driving magnet 521a is located in the section A illustrated in FIG. 7 when the current is turned off, or the driving magnet 521a remains at the same position it was in when the current was turned off if the center of the driving magnet 521a is located in the section B illustrated in FIG. 7 when the current is turned off.

The above-described examples enable a camera module to selectively change the amount of incident light through an aperture module. Even when the aperture module is mounted in the camera module, a degradation in autofocusing (AF) function is prevented. Moreover, an increase in weight caused by adding the aperture module is significantly reduced.

The examples of an aperture module described above enable a current required to drive the aperture module to be reduced, and enable a size of an aperture hole to be continuously changed to obtain a precise size that is required.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
an aperture module configured to be mounted on a lens module, the aperture module comprising a plurality of blades and being further configured to form various-sized aperture holes with the plurality of blades; and
an aperture driving portion comprising a moving portion and a driving coil, the moving portion being configured to be movable and comprising a driving magnet opposing the driving coil, the moving portion being directly or indirectly connected to the plurality of blades to enable the moving portion to move the plurality of blades,
wherein the moving portion is further configured to be movable in a fixed section in which the moving portion does not move the plurality of blades as the moving portion moves in the fixed section, and a driving section in which the moving portion moves the plurality of blades as the moving portion moves in the driving section, and
the moving portion is further configured to move in response to power being supplied to the driving coil, and remain fixed at a position at which the moving portion is located at a time the power being supplied to the driving coil is cut off while the moving portion is located in the driving section.

2. The camera module of claim 1, wherein the aperture module is further configured to continuously change a size of the aperture hole.

3. The camera module of claim 1, further comprising a yoke opposing the driving magnet,
wherein an attractive force between the yoke and the driving magnet holds the moving portion against the aperture module.

4. The camera module of claim 3, wherein the yoke has a shape that causes the attractive force between the yoke and the driving magnet to be greatest at one side of the fixed section, and
the attractive force between the yoke and the driving magnet is strong enough to pull the moving portion to the one side of the fixed section.

5. The camera module of claim 4, wherein the attractive force between the yoke and the driving magnet is strong enough to pull the moving portion to the one side of the fixed section at a time the power being supplied to the driving coil is cut off while the moving portion is located in the fixed section.

6. The camera module of claim 1, wherein the moving portion is further configured to be rectilinearly reciprocable.

7. The camera module of claim 1, wherein each of the plurality of blades has a boomerang shape.

8. The camera module of claim 7, wherein each of the plurality of blades has a V-shaped internal side portion forming a portion of the aperture hole.

9. The camera module of claim 7, wherein each of the plurality of blades has a curved internal side portion forming a portion of the aperture hole.

10. The camera module of claim 1, wherein the moving portion is further configured to be movable in a linear motion, and
the camera module further comprises a rotation plate linked to the moving portion and the plurality of blades, and configured to rotate the plurality of blades in response to the moving portion moving in the linear motion.

11. The camera module of claim 10, wherein the rotation plate comprises a plurality of driving shafts configured to move the plurality of blades,
each of the plurality of blades comprises a driving shaft hole fitted onto a corresponding one of the driving shafts, and
the driving shaft hole comprises a first section substantially parallel to a rotation direction of the rotation plate, and a second section inclined to the rotation direction of the rotation plate.

12. The camera module of claim 11, wherein the driving shafts move in the driving shaft holes as the rotation plate rotates,
the driving shafts do not move the plurality of blades while the driving shaft shafts are moving in the first sections of the driving shaft holes, and
the driving shafts move the plurality of blades while the driving shaft shafts are moving in the second section of the driving shaft holes.

13. A camera module comprising:
an aperture module configured to be mounted on a lens module, the aperture module comprising a plurality of blades and being further configured to form various-sized aperture holes with the plurality of blades;
an aperture driving portion comprising a moving portion and a driving coil, the moving portion being configured to be movable and comprising a driving magnet opposing the driving coil, the moving portion being directly or indirectly connected to the plurality of blades to enable the moving portion to move the plurality of blades; and
a yoke opposing the driving magnet, an attractive force between the yoke and the driving magnet holding the moving portion against the aperture module,
wherein the attractive force between the yoke and the driving magnet is strong enough to pull the moving portion to one side of a moving section of the moving portion, and
the moving section of the moving portion comprises a section in which the attractive force between the yoke and the driving magnet is smaller than a minimum force required to move the moving portion in a stationary state.

14. The camera module of claim 13, wherein the moving portion moves the plurality of blades while the moving portion moves in the section in which the attractive force between the yoke and the driving magnet is smaller than the minimum force required to move the moving portion in the stationary state.

15. The camera module of claim 14, the moving section of the moving portion further comprises a fixed section in which the moving portion does not move the plurality of blades while the moving portion moves in the fixed section.

16. The camera module of claim 15, wherein the moving portion is further configured to move in response to power being supplied to the driving coil, and remain fixed at a position at which the moving portion is located at a time the power being supplied to the driving coil is cut off while the moving portion is located in the section in which the attractive force between the yoke and the driving magnet is smaller than the minimum force required to move the moving portion in the stationary state.

17. An aperture module comprising:
   an aperture module comprising a plurality of blades configured to form an aperture hole;
   a driving coil; and
   a moving portion configured to be movable between a first position and a second position and comprising a driving magnet opposing the driving coil, the moving portion being linked to the plurality of blades to enable the moving portion to not move the plurality of blades as the moving portion moves from the first position to a third position between the first position and the second position, and move the plurality of blades to change a size of the aperture hole as the moving portion moves from the third position to the second position.

18. The aperture module of claim 17, wherein the plurality of blades are further configured to form an aperture hole having a maximum size as the moving portion moves from the first position to the third position without moving the plurality of blades, and
   the moving portion moves the plurality of blades to change a size of the aperture hole from the maximum size to a minimum size as the moving portion moves from the third position to the second position.

19. The aperture module of claim 17, wherein the moving portion is further configured to move in response to a current being supplied to the driving coil, return to the first position at a time the current supplied to the driving coil is cut off while the moving portion is moving between the first position and the third position, and remain at a position at which the moving portion is located at a time the current supplied to the driving coil is cut off while the moving portion is moving between the third position and the second position.

20. The aperture module of claim 17, wherein the aperture module further comprises a rotation plate comprising a plurality of driving shafts and a guide hole,
   the plurality of blades are further configured to rotate about respective axes to change a size of the aperture hole,
   each of the plurality of blades comprises a driving shaft hole fitted onto a respective one of the driving shafts,
   the moving portion further comprises a driving projection engaging the guide hole of rotation plate, and is further configured to move in a linear motion between the first position and the second position, thereby moving the driving projection in a linear motion, and
   the rotation plate is configured to rotate in response to the driving projection moving in the linear motion while engaging the guide hole of the rotation plate, thereby causing the driving shafts to move in the driving shaft holes and rotate the plurality of blades to change the size of the aperture hole.

21. An aperture module comprising:
   an aperture module comprising a plurality of blades configured to form an aperture hole;
   a driving coil;
   a moving portion configured to be movable between a first position and a second position and comprising a driving magnet opposing the driving coil, the moving portion being linked to the plurality of blades to enable the moving portion to move the plurality of blades to change a size of the aperture hole as the moving portion moves; and
   a yoke opposing the driving magnet,
   wherein an attractive force between the yoke and the driving magnet holds the moving portion against the aperture module, and decreases from a maximum attractive force at the first position of the driving portion to a minimum attractive force at the second position of the driving force.

22. The aperture module of claim 21, wherein the yoke comprises:
   a main magnetic portion that is symmetrical with respect to a center point of a movement range of the moving portion; and
   an additional magnetic portion that is asymmetrical with respect to the center point of the movement range.

23. The aperture module of claim 21, wherein the attractive force between the yoke and the driving magnet becomes less than a minimum force required to move the moving portion in a static state at a third position between the first position and the second position.

24. The aperture module of claim 21, wherein the moving portion is further configured to move in response to a current being supplied to the driving coil, and
   the attractive force is strong enough to pull the moving portion back to the first position at a time the current supplied to the driving coil is cut off while the moving portion is moving between the first position and a third position between the first position and the second position, but is not strong enough to move the moving portion at a time the current supplied to the driving coil is cut off while the moving portion is moving between the third position and the second position.

* * * * *